(12) United States Patent
Elmar

(10) Patent No.: US 11,352,219 B2
(45) Date of Patent: Jun. 7, 2022

(54) GRIPPING DEVICE AS WELL AS TRANSPORT DEVICE FOR GRIPPING, HOLDING AND GUIDING IN PARTICULAR BOTTLE-LIKE CONTAINERS

(71) Applicant: TYROLON-SCHULNIG GMBH, Hochfilzen (AT)

(72) Inventor: Schulnig Elmar, St. Jakob i.H. (AT)

(73) Assignee: TYROLON-SCHULNIG GMBH, Hochfilzen (AT)

( * ) Notice: Subject to any disclaimer, the term of this patent is extended or adjusted under 35 U.S.C. 154(b) by 55 days.

(21) Appl. No.: 17/061,644

(22) Filed: Oct. 2, 2020

(65) Prior Publication Data

US 2021/0129349 A1    May 6, 2021

(30) Foreign Application Priority Data

Oct. 30, 2019   (EP) .................................... 19206198

(51) Int. Cl.
*B65G 47/90*     (2006.01)
*B25J 15/00*     (2006.01)
*B65G 47/86*     (2006.01)

(52) U.S. Cl.
CPC ........ *B65G 47/847* (2013.01); *B25J 15/0028* (2013.01); *B65G 47/904* (2013.01); *B65G 2201/0244* (2013.01)

(58) Field of Classification Search
CPC ................ B65G 47/847; B65G 47/904; B65G 2201/0244; B25J 15/0226
USPC ....................................................... 294/116
See application file for complete search history.

(56) References Cited

U.S. PATENT DOCUMENTS

| | | | |
|---|---|---|---|
| 3,630,391 A * | 12/1971 | Wilson ................... | B21D 43/10 414/744.8 |
| 4,023,513 A * | 5/1977 | Dean ....................... | B21D 24/16 72/418 |
| 4,034,542 A * | 7/1977 | Loehr ................... | A01D 46/247 56/333 |
| 4,232,780 A * | 11/1980 | Cross .................... | B65G 17/12 198/803.7 |
| 4,537,389 A * | 8/1985 | Kancnik ................. | B25B 5/087 269/234 |
| 4,982,834 A * | 1/1991 | Jacobsen .................. | B65H 5/14 198/803.7 |
| 7,451,868 B2 * | 11/2008 | Legallais ............. | B65G 47/847 198/470.1 |
| 9,022,442 B2 * | 5/2015 | Rousseau ............. | B25J 15/0028 294/90 |
| 9,193,538 B2 * | 11/2015 | Schulnig ............... | B65G 37/00 |

(Continued)

FOREIGN PATENT DOCUMENTS

| | | |
|---|---|---|
| CN | 203545126 U | 4/2014 |
| EP | 2769942 B2 | 8/2014 |
| EP | 3165482 A1 | 5/2017 |

*Primary Examiner* — Dean J Kramer
(74) *Attorney, Agent, or Firm* — Shumaker, Loop & Kendrick, LLP; James D. Miller

(57) ABSTRACT

A gripper arm for a gripping device for gripping, holding and guiding in particular bottle-like containers includes a base body, a gripping section as well as at least one actuating roller arranged on the base body and rotatably mounted for interacting with a control cam of the gripping device. The at least one actuating roller is arranged on the base body so as to be replaceable.

10 Claims, 3 Drawing Sheets

(56) References Cited

U.S. PATENT DOCUMENTS 9,604,791 B2 * 3/2017 Fahldieck ............ B65G 47/847
2013/0193702 A1 * 8/2013 Fahldieck ............ B65G 47/847
                                                         294/199

* cited by examiner

GRIPPING DEVICE AS WELL AS TRANSPORT DEVICE FOR GRIPPING, HOLDING AND GUIDING IN PARTICULAR BOTTLE-LIKE CONTAINERS

CROSS-REFERENCE TO RELATED APPLICATION

This patent application is a U.S. Utility Patent Application which claims priority to European Patent Application No. 19 206 198.4 filed Oct. 30, 2019, the entire disclosure of which is hereby incorporated herein by reference.

FIELD OF THE INVENTION

The invention relates to a gripper arm, a gripping device as well as a transport device for gripping, holding and guiding in particular bottle-like containers.

BACKGROUND OF THE INVENTION

Gripping devices with gripper arms for gripping, holding and/or guiding in particular substantially round containers are already known from the prior art and are used in the production line processing of such containers.

To be understood by the term container in the context of the present invention is in particular, albeit not exclusively, containers having a substantially circular cross section, e.g. bottles, cans or glassware, consisting of glass, metal or plastic according to the respective requirements. The term "substantially round" in the context of the present invention does not refer to round containers in the geometric sense exclusively, but also to e.g. oval, regularly polygonal, etc. ones which in particular exhibit a substantially circular, but for example also oval or polygonal cross section.

When being cleaned, filled or sealed, the containers are usually grasped at an entry point station by means of a gripping device having at least one pair of gripper arms and then transported to the next station within the process. Such a gripping device for a container transport system typically has at least two gripper arms and can switch between a gripping position and an open position. In order to transport a container, the gripper arms normally grasp below the neck collar or—in the case of bottles or other elongated containers—around the mid-section of the container.

A control cam, for example, thereby functions as an opening means. To this end, the control cam, usually not a part of the gripper arm, cooperates with at least one actuating roller of the gripper arm. When the gripping device is thereby opened by the control cam, a force is applied to the at least one actuating roller against the inside of the gripper arm. Thus, in other words, the control cam pushes the gripper arm pair apart and thereby opens the gripping device.

Particularly when the container is to be grasped at the mid-section, the gripping device must be suited to firmly holding the container in a specific, in particular upright position. This requires a precise grip and hold on the container, which all starts with a reliable opening of the gripping device.

Due to interacting with the control cam, however, the at least one actuating roller is subject to mechanical wear, which has a detrimental effect on the reliable opening of the gripping device. The at least one actuating roller must therefore be replaced at regular intervals depending on the extent of utilization of the gripping device, which entails stoppage of the gripping device or even the entire system. This is usually associated with high costs and great effort.

Using this as a starting point, the invention is thus based on the task of specifying a gripper arm, a gripping device as well as a transport device, with which the time associated with a servicing interval and in particular a replacing of high-maintenance components can be shortened.

SUMMARY OF THE INVENTION

With regard to the gripper arm, the task is specifically solved by a gripper arm for a gripping device for gripping, guiding and holding in particular bottle-like containers. The gripper arm thereby exhibits a base body and a gripping section arranged on the base body. The base body in particular serves in the gripping, holding and guiding of the in particular bottle-like containers. The gripper arm furthermore comprises at least one actuating roller likewise arranged on the base body and rotatably mounted. The at least one actuating roller thereby serves the interacting with a control cam of the gripping device. During operation of the gripper arm, or gripping device respectively, the control cam in this configuration serves as an opening means and presses against the actuating roller of the gripper arm to move the gripper arm from a gripping position into an open position.

According to the invention, the at least one actuating roller is arranged on the base body so as to be replaceable. To be understood by replaceable in the context of the present invention is the actuating roller preferably being able to be replaced without any special tool and in particular without any tool at all, thus in other words "by hand." Contrary to the general definition, tool-free replacement hereby also additionally refers to the use of just simple tools such as e.g. a screw-driver and/or pliers to replace the at least one actuating roller.

Moreover understood by replaceable is thus a reversible arrangement of the at least one actuating roller so that the at least one actuating roller can be replaced without any (partial) damage to the gripper arm and/or the at least one actuating roller.

Thus achieved is a simple and time-saving replacement of the at least one actuating roller which at the same time reduces the downtime of the gripper arm and/or the gripping device.

According to one embodiment, the base body comprises a pin-like seating for the at least one replaceable actuating roller. This thereby ensures a simple and secure arrangement and guidance of the actuating roller.

Given a plurality of actuating rollers, a plurality of pin-like seatings is preferably provided. Alternatively or additionally given a plurality of actuating rollers, it is also possible for two or more actuating rollers to be arranged, in particular fit, onto one pin-like seating.

Preferentially and pertinently, the at least one actuating roller is thereby replaceably mounted on the pin-like seating. This allows for simple and fast mounting, or simple and fast replacement respectively, of the at least one actuating roller.

In order to ensure easy accessibility to the at least one actuating roller, in particular for replacement, the at least one actuating roller is arranged on an upper side of the base body. During the replacement, the at least one actuating roller is thereby simply grasped from above and pulled upward off the pin-like seating. A new actuating roller is then fit onto the pin-like seating from above in reverse order.

In order to further optimize the accessibility and replaceability of the at least one actuating roller, the at least one actuating roller is arranged on the base body so as to be exposed. In the context of the present invention, exposed is to be understood as the at least one actuating roller not being covered or concealed by other components of the gripper arm or the gripping device. In other words, when in its disposed state, the at least one actuating roller is accessible from e.g. at least three sides.

According to one preferential embodiment, the base body in particular exhibits a groove-like recess. In accordance with this embodiment, the at least one actuating roller is arranged in this recess so as to be replaceable. The recess thus conceals two sides of the at least one actuating roller in its disposed state. In order to ensure the rotatability of the at least one actuating roller and to guarantee it in the present embodiment, a gap is formed between the at least one actuating roller and the sides of the groove-like recess. In other words, the at least one actuating roller does not form a positive fit with the two sides of the recess.

In this regard, the present embodiment expands the previously described definition of exposed to the extent of the "exposed arrangement" also including the above-described arrangement of the at least one actuating roller, as it is still accessible from three sides.

The in particular groove-like recess enables a space-saving arrangement of the at least one actuating roller with regard to total gripper arm height without limiting the function of the at least one actuating roller. In other words, the gripper arm according to the invention is thus of very compact construction, which is advantageous particularly in applications with limited available space.

Preferably, the at least one actuating roller is arranged between a bearing bore in the base body, which serves in receiving a bearing pin, and the gripping section. This arrangement has proven particularly advantageous in terms of optimizing a compact design of the gripper arm.

The at least one actuating roller expediently comprises a plastic. In particular, the at least one actuating roller is made entirely of plastic. This has the advantage of the at least one actuating roller being made of a durable and in particular abrasion-resistant material. This design is based on the concern of the at least one actuating roller physically coming into (frictional) contact with the control cam several hundred thousand times during operation depending on application.

Moreover, the at least one actuating roller can consequently be produced inexpensively as a wear part, and especially as a disposable part, which reduces the total costs of the gripper arm. Actuating rollers made of plastic have also proven more advantageous in terms of noise compared to actuating rollers made of metal.

Alternatively, the at least one actuating roller comprises a metal, e.g. steel or aluminum, or is made of such a metal. Further alternatively, the at least one actuating roller can comprise a metal along with a plastic casing. Further alternatively, the at least one actuating roller can have a plastic core and a plastic casing arranged around it, wherein the two plastics (the core and the casing) exhibit different properties.

In one embodiment, the pin-like seating exhibits a bore hole. The bore hole serves to accommodate at least one opening means or at least one closing means. In this embodiment, the at least one opening means or at least one closing means is then locationally arranged above the at least one actuating roller, which advantageously reduces the gripper arm length compared to an arrangement of the least one closing or opening means alongside the least one actuating roller.

According to one expedient configuration, a sliding bearing is provided on the base body or on the at least one actuating roller in order to optimize the rotatable bearing of the at least one actuating roller on the base body.

With regard to the gripping device, the task is specifically solved by a gripping device for gripping, holding and guiding in particular bottle-like containers which has at least one gripper arm pair comprising a first gripper arm as well as a second gripper arm of complementary form to the first gripper arm. The two gripper arms are in particular the gripper arm as already referred to above.

The general structure of such a gripping device as well as a general structure of the above gripper arm is described for example in EP 2 769 942 B1, which stems from the applicant and to which reference is insofar made at this point, and is entirely incorporated herein by reference.

The gripping device thus comprises at least one bearing unit for the supporting of the gripper arm pair. The bearing unit thereby has a respective bearing pin which serves in accommodating the base body. To that end, the base body has a bore hole in which the bearing pin sits when mounted.

The gripping device furthermore comprises at least one closing means for closing the gripper arm pair from an open position into a gripping position as well as at least one opening means for opening the gripper arm pair from the gripping position into the open position.

With regard to the transport device, the task is specifically solved by a transport device for the gripping, holding and guiding of in particular bottle-like containers, wherein at least one gripping device is arranged in a circumferential direction of the transport device such that the at least one gripper arm pair of the gripping device is directed radially outwardly. The at least one gripping device is in particular the gripping device as described above. Furthermore, a plurality of such gripping devices are preferentially arranged circumferentially adjacent one another on the transport device. Due to the resulting geometry of the transport device, it is also referred to as a transport star.

BRIEF DESCRIPTION OF THE DRAWINGS

Example embodiments of the invention are described in greater detail below on the basis of the figures. These show, to some extent in highly simplified representations.

DETAILED DESCRIPTION OF THE INVENTION

Figure 1:
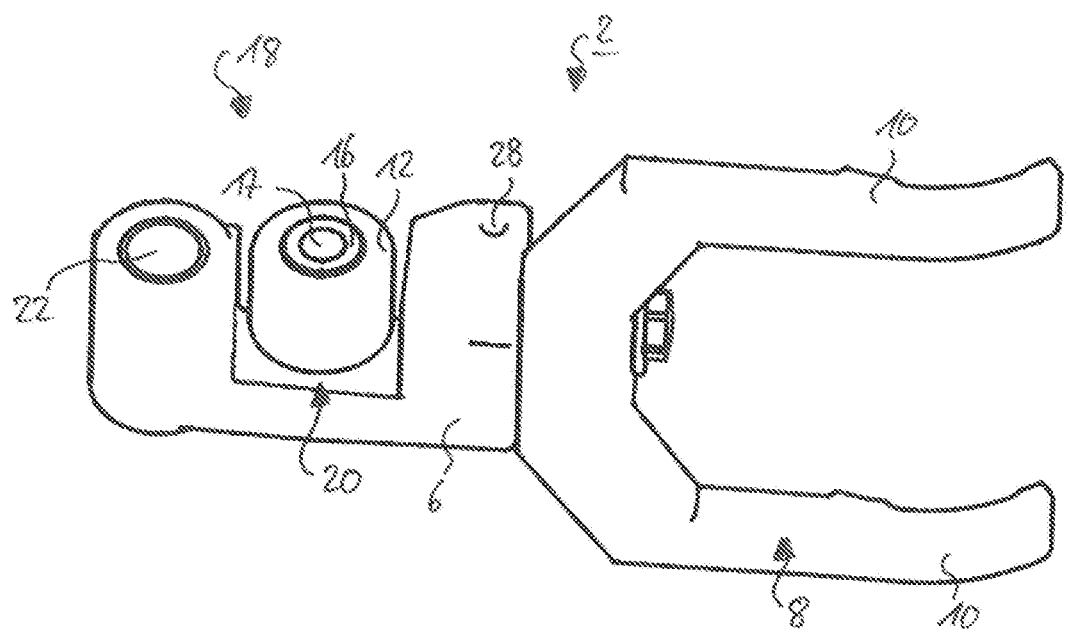
FIG. 1 is a perspective view of an inventive gripper arm for a gripping device.

In the figures, components rendering the same effect are always depicted with the same reference numerals.

The gripper arm 2 for a gripping device 4 depicted in FIG. 1 (cf. FIG. 2) for the gripping, holding and guiding of in particular bottle-like containers (not shown) comprises a base body 6 and a gripping section 8 arranged on the base body 6. In the embodiment according to FIG. 1, the gripping section 8 is integrally formed; i.e. monolithic, and made of plastic. The gripping section 8 is further-more designed like a fork having two gripper fingers 10 in order to grasp the in particular bottle-like containers.

The gripper arm 2 furthermore comprises an actuating roller 12 arranged on the base body 6 which is also rotatably mounted. Alternatively, a plurality of actuating rollers 12 can also be arranged on the base body 6. The actuating roller 12 serves in the interacting with a control cam 14 (cf. FIG. 2) of the gripping device 4. The actuating roller 12 is arranged on the base body 6 so as to be replaceable and, in particular, replaceable without tools in order to ensure the actuating roller 12 can be quickly and easily replaced. The actuating roller 12 additionally comprises a plastic and is in particular entirely made of plastic. This increases the mechanical durability of the actuating roller 12 which is in (frictional) contact with the control cam 14 when mounted and when the gripping device 4 is in operation (cf. FIGS. 2 and 3). Alternatively, the actuating roller 12 comprises a metal, same being optionally provided with a plastic casing.

In order for the actuating roller 12 to be arranged on the base body 6 so as to in particular be rotatable, the base body 6 comprises a pin-like seating 16 onto which the actuating roller 12 is removably fit. Alternatively or additionally, a (not depicted) sliding bearing is provided which is arranged either on the pin-like seating 16 or on the actuating roller 12 and optimizes the rotatability of the actuating roller 12. For the optional arrangement of an opening means or a closing means 26, the pin-like seating 16 has a bore hole 17 designed to receive an opening means or a closing means 26.

Furthermore, the actuating roller 12 is in particular arranged on an upper side 18 of the base body 6 so as to be exposed in order to enable easy accessibility for replacement. The exposed arrangement is thereby to be understood as meaning the actuating roller 12 not being covered or concealed by other components of the gripper arm 2, particularly when the gripper arm 2 is mounted.

In the example embodiment according to FIG. 1, the base body 6 exhibits a groove-like recess 20 in which actuating roller 12 sits. The pin-like seating 16 is likewise arranged in recess 20 to that end. Thus when mounted, the actuating roller 12 is in substantially flush arrangement with the upper side 18 of the base body and consequently ensures that the gripper arm 2 as a whole is of compact structure.

In the gripper arm 2 shown in FIG. 1, the actuating roller 12 is arranged between a bearing bore 22 and the gripping section 8. The bearing bore 22 serves in accommodating a bearing pin 24 as illustrated in FIG. 2.

In order to arrange an opening means or a closing means 26 on the gripper arm 2, the base body 6 exhibits a fixing means 28 in the form of a bore hole as only implied in FIG. 1.

Figure 2:
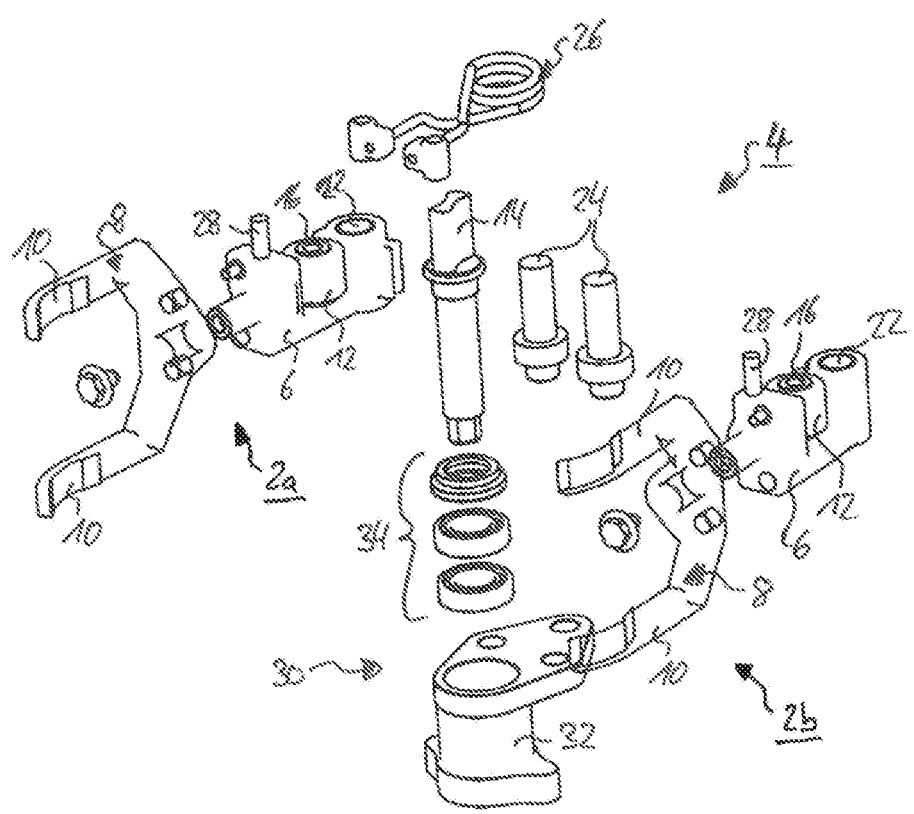
FIG. 2 is an exploded view of a gripping device.
Figure 3:
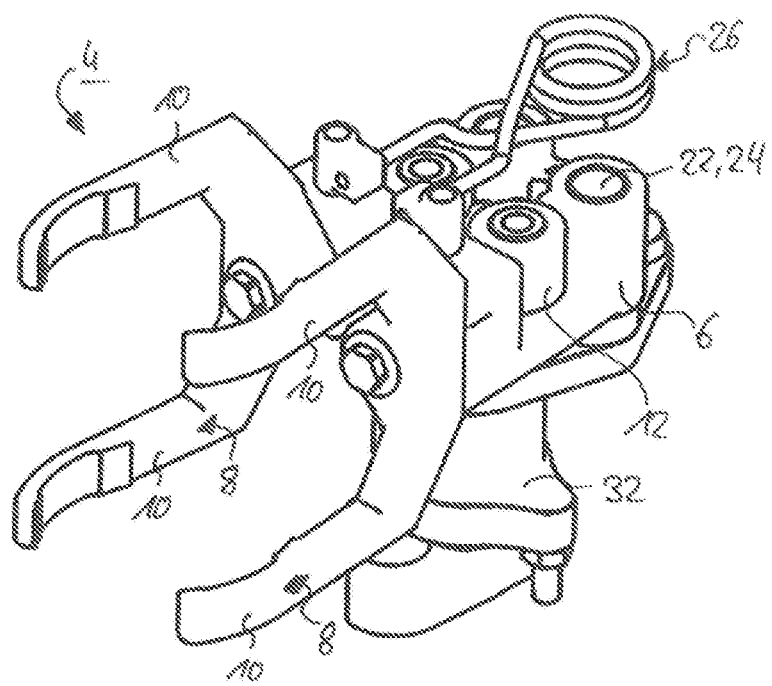
FIG. 3 is a perspective view of the gripping device in the assembled state.

The gripping device 4 depicted in FIGS. 2 and 3 exhibits a gripper arm pair comprising a first gripper arm 2a and a second gripper arm 2b. The gripping device 4 furthermore exhibits a bearing unit 30 with the previously cited bearing pin 24 and a bearing body 32. In the assembled state, which is shown in FIG. 3, the two gripper arms 2a, 2b are arranged on the bearing body 32. Each of the bearing pins 24 of the bearing unit 30 sit in a respective bearing bore 22 and enable, due to the rotatable bearing, a moving of the gripper arm pair from an open position into a gripping position and vice versa. The gripping device 4 is shown in the gripping position in FIG. 3.

The control cam 14 interacts with the two actuating rollers 12 of the gripper arm pair such that it serves as an opening means in the example embodiment. By rotating on its longitudinal axis, the control cam 14 thereby pushes the two actuating rollers 12 apart and thus moves the gripping device 4 from the gripping position into the open position.

A closing means 26 configured as a torsion spring is provided to subsequently return the gripping device 4 from the open position into the gripping position. The legs of same are each arranged on a respective fixing means 28 of the base body 6 configured as a pin.

Furthermore, bearing components 34 are also provided in the embodiment example according to FIGS. 2 and 3, these serving in the rotatable bearing of the control cam 14.

Figure 4:
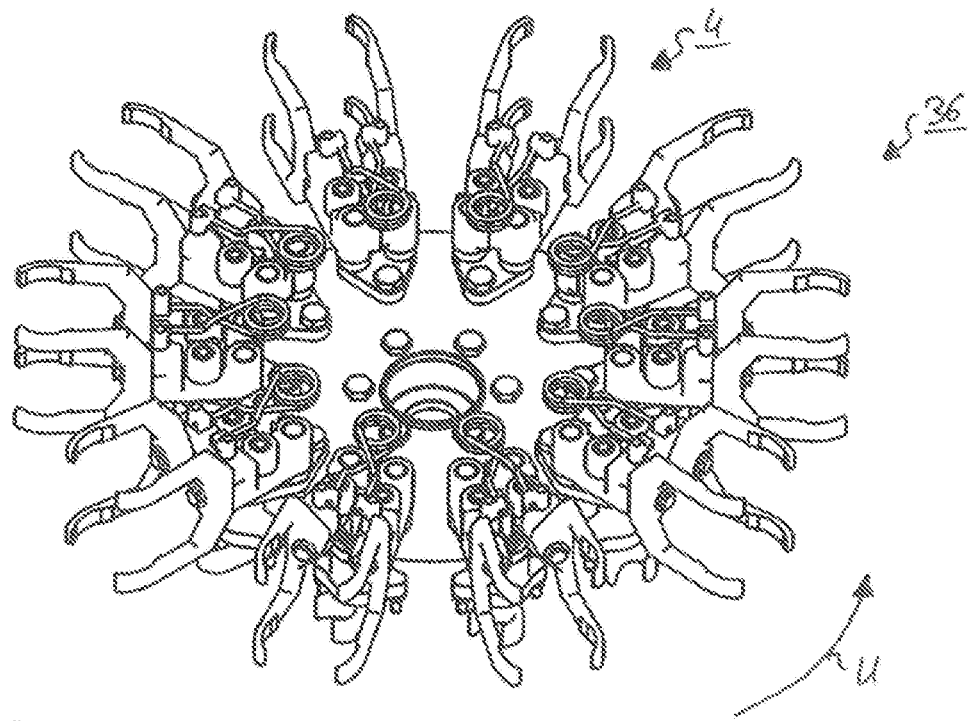
FIG. 4 is a perspective view of an inventive transport device according to a first embodiment, as well as FIG. 5 is a perspective view of an inventive transport device according to a second embodiment.

FIG. 4 shows a transport device 36 with a plurality of gripping devices 4 pursuant to a first embodiment arranged on said transport device 36. The gripping devices 4 are thereby arranged on the transport device 36 in a circumferential direction U and particularly screwed onto the transport device 36 by the bearing body 32. The gripper arm pairs of the gripping devices 4 are thereby arranged radially outwardly. According to the first embodiment shown in FIG. 4, the gripping devices 4 each exhibit a closing means 26 configured as a spring and particularly as a torsion spring.

Figure 5:
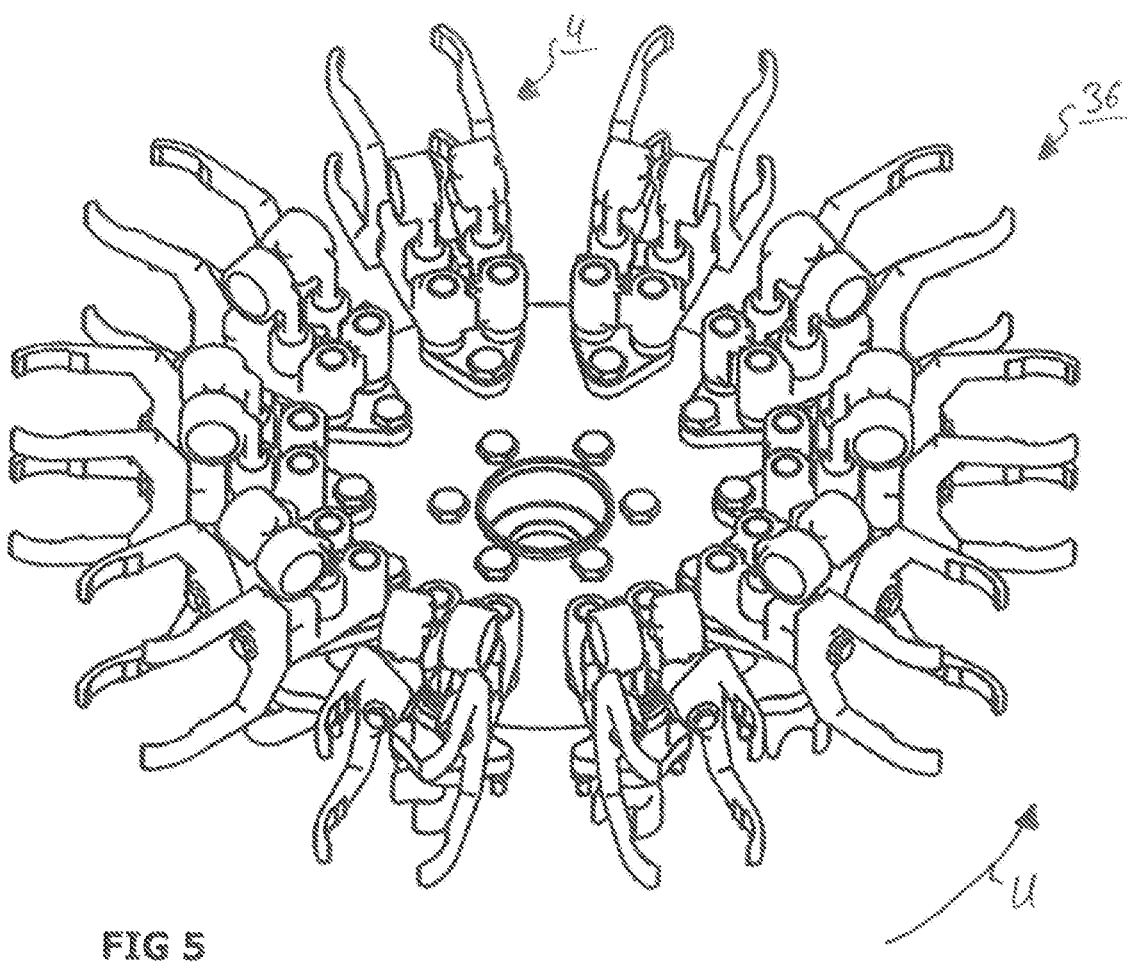

FIG. 5 depicts a transport device 36 pursuant to a second embodiment. The transport device 36 of the second embodiment essentially corresponds to the transport device 36 according to the first embodiment (cf. FIG. 4). What differs is the closing means 26 of the gripping devices 4 being configured as a pair of magnets according to the second embodiment of the transport device 36.

The invention is not limited to the exemplary embodiments described above. Rather, one skilled in the art can also derive other variants of the invention therefrom without departing from the subject matter of the invention. In particular, all the individual features described in conjunction with the exemplary embodiments can also be combined in other ways without departing from the subject matter of the invention.

LIST OF REFERENCE NUMERALS 2 gripper arm
4 gripping device
6 base body
8 gripping section
10 gripper finger
12 actuating roller
14 control cam
16 pin-like seating
17 bore hole within pin-like seating
18 upper side
20 recess
22 bearing bore
24 bearing pin
26 closing means
28 fixing means
30 bearing unit
32 bearing body
34 bearing component
36 transport device
U circumferential direction

What is claimed is:

1. A gripper arm for a gripping device for gripping, holding and guiding bottle-like containers, comprising:
   a base body;
   a gripping section arranged on the base body; and
   at least one actuating roller arranged on the base body and rotatably mounted for interacting with a control cam of the gripping device, wherein the at least one actuating roller is arranged on the base body so as to be replaceable, wherein the base body further comprises a pin-like seating for the at least one actuating roller, and wherein the pin-like seating exhibits a bore hole for accommodating an opening means or a closing means.

2. The gripper arm according to claim 1, wherein the at least one actuating roller is replaceably mounted on the pin-like seating.

3. The gripper arm according to claim 1, wherein the at least one actuating roller is arranged on an upper side of the base body.

4. The gripper arm according to claim 1, wherein the at least one actuating roller is arranged on the base body so as to be exposed.

5. The gripper arm according to claim 1, wherein the base body includes a groove-like recess in which the at least one actuating roller is arranged so as to be replaceable.

6. The gripper arm according to claim 1, wherein the at least one actuating roller is arranged between a bearing bore of the base body for accommodating a bearing pin and the gripping section.

7. The gripper arm according to claim 1, wherein the at least one actuating roller is made of plastic.

8. The gripper arm according to claim 1, wherein a sliding bearing is provided on the base body or on the at least one actuating roller for the rotatable bearing of the at least one actuating roller.

9. A gripping device for gripping, holding and guiding bottle-like containers, the gripping device comprising:
- at least one gripper arm pair of a first gripper arm and a second gripper arm of complementary form to the first gripper arm of claim 1;
- at least one bearing unit for supporting of the gripper arm pair;
- at least one closing means for closing the gripper arm pair from an open position into a gripping position; and
- at least one opening means for opening the gripper arm pair from the gripping position into the open position.

10. A transport device for gripping, holding and guiding bottle-like containers, wherein the gripping device of claim 9, is arranged in a circumferential direction of the transport device such that the at least one gripper arm pair of the gripping device is directed radially outwardly.

* * * * *